(12) United States Patent
Myr

(10) Patent No.: US 7,739,182 B2
(45) Date of Patent: Jun. 15, 2010

(54) MACHINE LEARNING AUTOMATIC ORDER TRANSMISSION SYSTEM FOR SENDING SELF-OPTIMIZED TRADING SIGNALS

(75) Inventor: David Myr, Jerusalem (IL)

(73) Assignee: Makor Issues and Rights Ltd., Jerusalem (IL)

( * ) Notice: Subject to any disclaimer, the term of this patent is extended or adjusted under 35 U.S.C. 154(b) by 1413 days.

(21) Appl. No.: 10/613,467

(22) Filed: Jul. 3, 2003

(65) Prior Publication Data

US 2005/0015323 A1  Jan. 20, 2005

(51) Int. Cl.
*G06Q 40/00* (2006.01)
(52) U.S. Cl. ........................... 705/37; 705/36 R
(58) Field of Classification Search ............ 705/35, 705/36, 37, 38, 39; 235/379, 380
See application file for complete search history.

(56) References Cited

U.S. PATENT DOCUMENTS 6,317,728 B1 * 11/2001 Kane .................. 705/36 R
6,594,643 B1 *  7/2003 Freeny, Jr. ........... 705/36 R

OTHER PUBLICATIONS

Aregon International (Aregon raises the heat with TS-STAR . . . Dealing With Technology, v 2, n 2, p N/A. Dec. 1989.ISSN:0955-2138).*

* cited by examiner

*Primary Examiner*—Ojo O Oyebisi
(74) *Attorney, Agent, or Firm*—RatnerPrestia

(57) ABSTRACT

A Multi-Channel Machine Learning system, method and computer program is for automated simultaneous transmission of a number of Buy/Sell orders generated according to differently self-optimized trading parameters for each independent trading strategy. Optimization could be performed according to every optimization method used. Perpetual real-time optimization (or self-optimization) of trading parameters adds Machine Learning feature to the invention and it is done independently for each trading strategy. A centralized trading system is provided for the individual user or organization that wants to perform his trading automatically and completely without human intervention from receiving the data from the central server provider to real-time order execution in computerized financial markets. The disclosed system is working based on an API/DSK programming tools and is integrated into a network of brokers, banks and other institutions trading on computerized markets, through a number of parallel working connection channels.

13 Claims, 6 Drawing Sheets

MACHINE LEARNING AUTOMATIC ORDER TRANSMISSION SYSTEM FOR SENDING SELF-OPTIMIZED TRADING SIGNALS

BACKGROUND OF THE INVENTION/RELEVANT TERMS AND DEFINITIONS

"Securities" are investment instruments issued by a corporation, government or other organization which offers equity or debt.

"Exchange" means a national, regional, or worldwide computerized marketplace where securities can be traded including for example, NASDAQ or FOREX.

"Execution" refers to completion of an order to buy or sell securities.

"Orders" are electronic orders for purchase or sale of securities.

"Filled order" means order fully executed, i.e. all shares in the order have been executed.

"Bar" means one unit of trading data. For example, 1-minute bar represents the data for one minute of trading.

"Bid price" is the highest price any buyer is willing to pay for a given security.

"Ask price" is the lowest price at which any buyer is willing to sell a given security.

"Long" is the position of owning a security.

"Short" is the position of having sold a stock without buying it first.

There are several products on the financial software market that offer to individual trader optimization and Machine Learning capabilities on the one hand, and automatic order execution capabilities on the other hand. The present invention provides the system that combines both capabilities in one product. It presents an automatic order execution system that sends orders for execution according to self-optimized trading strategy parameters determined using Machine Learning and self-optimization features. Also, it uses a unique optimization method for determining these optimized trading strategy parameters.

There is a TradeStation Automated Execution system which is allowing traders to transfer orders automatically to the marketplace according to the predetermined strategy parameters. In a fast-moving marketplace, trading conditions are changing constantly. Trading parameters that used to be valid just one day ago may not be applicable today or tomorrow. The TradeStation user has to come back and to change his trading parameters according to marketplace changes. TradeStation, contrary to the invented system, does not offer trading based on self-optimized and Machine Learning parameters.

Additionally, there are a few automatic securities trading systems that offer automatic trading opportunity for institutional market participants. These data processing systems are used by market dealers and are designed to receive market orders from a plurality of traders and to route them automatically for market execution. For example, one of the market dealer firms is receiving millions of Buy/Sell orders from a plurality of clients and it executes them automatically at the marketplace. These systems are designed to create "an automated trading market for one or more securities". One of those systems is disclosed at U.S. Pat. No. 4,674,044. Contrary to these systems, our invented system is designed for automatic order transition and execution from the trader's computer to the marketplace.

There are several trading software products using various optimization methods to achieve optimal trading parameters. For example, OmniTrader software is optimizing predetermined trading strategy parameters and produces Buy/Sell order for a plurality of securities. However, it does not send these Buy/Sell orders to the marketplace without human intervention. The trader has to check trade signal parameters, to open another trading software, to insert order parameters and particulars for the specific security into the order execution box and to click on Buy/Sell button to send the order to his broker or investment bank.

In the past, market traders were largely dependent on information is supplied directly from the database of transactions in a form selected primarily for ease in communication. Online data providing supplied traders with market real-time information in a matter of seconds or even milliseconds thus providing rapid trading order execution. The trading of financial instruments such as stocks, currencies, options, futures and commodities has largely become a computer-supported operation. Almost all significant trading of securities is accomplished by a computer pursuant to the established protocols of the major exchanges.

There are various modes of buying or selling ("trading") securities. Aside from inter-party private transactions, trading is typically engaged on a national or regional exchange. The principles of this invention are generically applicable to securities trading in any market where orders can be send using computer.

For purposes of illustration only, hereafter we concentrate on two biggest markets: electronic stock market exchanges and foreign currency exchange (FOREX) but the present invention relates in the same manner to trading of other financial instruments on other computerized markets.

Computerized or electronic exchanges utilize electronic access of dealer posted market prices without a negotiating specialist or floor based exchange. The largest of these is the National Association of Securities Dealers Automated Quotation system, or NASDAQ. NASDAQ is a totally computer-based market where each member dealer (called market maker) can make its own market in the stocks traded on the exchange through a computer network.

A trader can route his orders to NASDAQ through one of the market makers or ECNs, or through one of the special electronic systems: SOES and SelectNet.

SOES (Small Order Execution System) is implemented by NASDAQ for orders up to 5,000 shares in order to help the small investor have his or her transactions executed without allowing market makers to take advantage of said small investor.

SelectNet, a negotiated system maintained by NASDAQ is a dialogue between the trader and the market makers for reflecting a bid or an offer. Only participating market makers can see trader's order.

On the New York Stock Exchange (NYSE), orders for specific securities are entered at a terminal operated by a licensed agent with a "seat" on the exchange. The order is processed through a stock "specialist", a firm that is obligated to manage transactions for a given security and the computerized order could be transmitted to NYSE through a "specialist" or ECNs.

The American Stock Exchange (AMEX) like the NYSE uses a "specialist" to maintain market liquidity. A computerized order could be sent to AMEX similarly as to NYSE.

Another important method of gaining access to all three major US exchanges (NASDAQ, NYSE and AMEX) is through one of the ECNs (Electronic Communications Networks). ECN is a private computerized trading system maintained separately from the public markets. An ECN is an order matching service that provides liquidity only by matching orders rather than by maintaining inventory.

FOREX market is the largest financial marketplace in the world today with daily average turnover of over $US1 trillion. The FOREX market is considered an OverTheCounter (OTC) or "interbank" market, due to the fact that transactions are conducted between two counterparts over the telephone or via an electronic network. Trading is not centralized on an exchange, as with the stock and futures markets. FOREX trading has evolved a great deal in the past five years. Similarly to stock markets, it became largely a computer-based operation. Most FOREX trading firms are offering now online trading platforms to enable their clients to deal online.

As previously indicated, we described hereby two biggest marketplaces in the world—FOREX and stock markets. Nevertheless, the principles of current invention are applicable to other computerized exchanges.

SUMMARY OF THE INVENTION

It is an object of the present invention to provide a completely automatic trading system allowing the user to store trading conditions for Buy/Sell signals using the power of Optimization and Machine Learning processes, to receive Buy/Sell signals from these Self-Optimizing and Machine Learning modules, to send an automatic order to computerized markets and to receive order execution confirmations; all completely automatic without human intervention.

More specifically, it is an object of the present invention to provide an automated trading system for qualifying and executing orders for securities transactions according to the Self-Optimized parameters.

Another object of the present invention is to provide an automatic trading method that reflects real-time dynamics of securities markets.

It is a further object of the present invention to provide automated trading apparatus which monitors the securities position and provides information regarding trading profits/losses.

It is yet a further object of this invention to provide a system for entering, executing and/or canceling securities Buy/Sell orders automatically and instantaneously in a real-time trading environment.

Finally, it is an object of this invention to provide an off-the-shelf ready-to-use trading system that allows active market participation by eliminating trader's inability to enter or execute orders automatically and that is based on the best possible trading parameters (self-optimizing parameters) in a real-time environment.

DETAILED DESCRIPTION OF THE INVENTION

Figure 1:
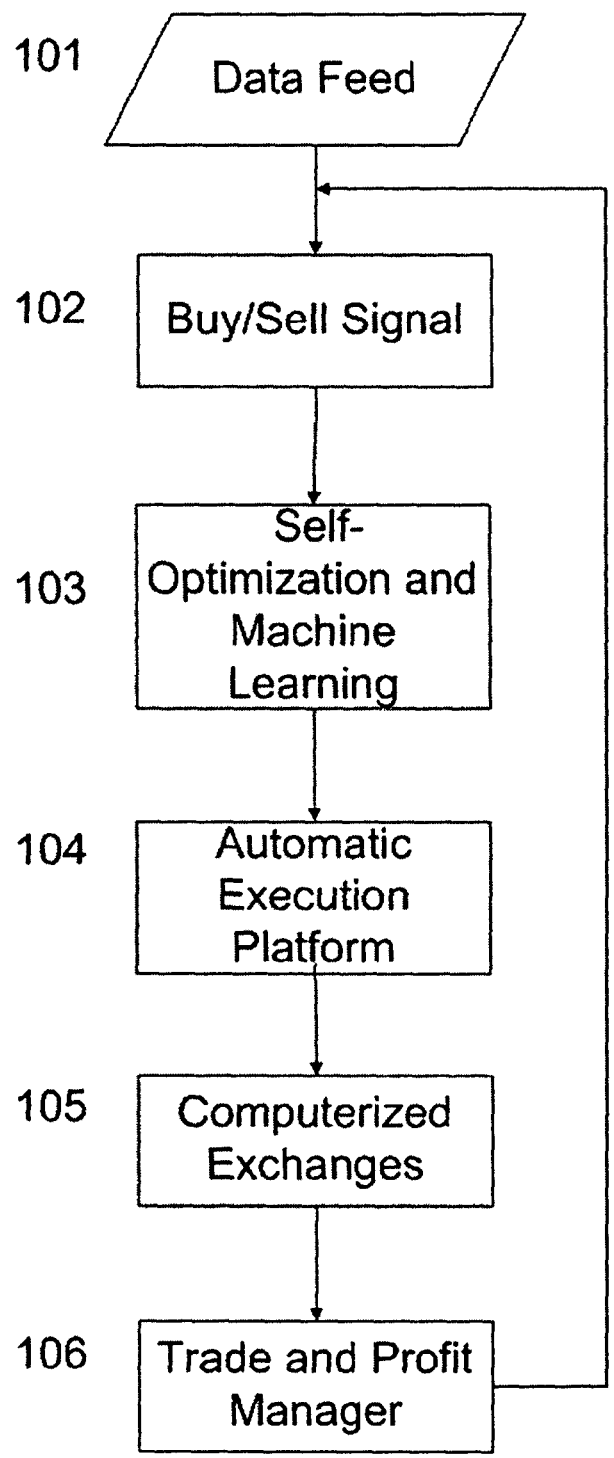
FIG. 1 provides a general overview of the invented system.

General overview of the system and its main components is shown in the flowchart in FIG. 1.

Invented system completely automates trading process from start to finish: it retrieves from the remote server and stores the current trade quotes, bid and asked prices for every security using Data Feed module (101); produces optimal Buy/Sell orders by searching pre-set trading strategy parameters and optimizing them on a backtest data using Trading Software module of the system (102); makes real-time self-optimization to these trading strategy parameters using our self-optimization and Machine Learning mechanisms module (103); sends orders for execution according to specific execution particulars and receives a confirmation of executed orders using Automatic Execution platform component of the system (104 and 105); and stores the trade details in a portfolio manager software—Trade and Profit Manager (106).

This invention relates to trading systems and, more specifically, to an improved data processing based system for implementing an automated and optimal trading mechanism for one or more securities on computerized financial markets and more specifically NASDAQ/NYSE/AMEX exchanges (which will be a subject of our further and more detailed explanation). It is an automated system for use by a trader of securities on an established computerized financial market for trading diversified market securities in a real-time environment. The system is integrated into a network of brokers, banks and other institutions trading on computerized markets for a plurality of securities.

The system works using direct access brokerage or banking account. When trader uses a direct access broker or bank to place an order, the order gets sent directly to the marketplace through direct access software. When trader uses an online broker or bank, he sends an order using a web interface. When trader clicks the "send" button to send the order via an online broker, his order will be emailed to the broker who then executes the order by sending it to market makers or ECNs which then execute the order themselves. Online brokerage user cannot choose to what market maker or ECN to send the order.

With direct access trading software, the trader simply clicks on the buy or sell button to send the order directly to the markets.

The system allows active market participation by investors while overcoming problems caused by trader inability to enter, change or execute orders automatically and using the best possible trading parameters in a real-time environment.

Data Feed

The user's trading system is integrated in a marketplace network for trading of financial instruments to deliver an online datastream to and from the system to the marketplace—it is both receiving data feed from data provider and sends Buy/Sell orders to computerized exchanges.

To receive data feed, we establish connection to one of the data feed providers servers using a set of Application Programming Interface (API) functions (API refers to a series of functions that are created by software developer in order to enable second-party software developers to facilitate interaction between his software and others).

There are several data feed providers that provide real-time market information from the financial markets worldwide. Our system constantly retrieves in real-time the best obtaining bid and asked prices, as well as last trade price and volume data, for a plurality of securities from a remote data server covering the ensemble of institutions making a market for the relevant securities. The user of the system chooses the portfolio of securities that he wants to trade. Data characterizing each security Buy/Sell orders is supplied to the system. The order is sent to the marketplace for execution by comparing its particular parameters with predetermined order parameters. Upon a change in the quoted price for a security, the system updates all relevant order qualification parameters.

Trading Software

Figure 2:
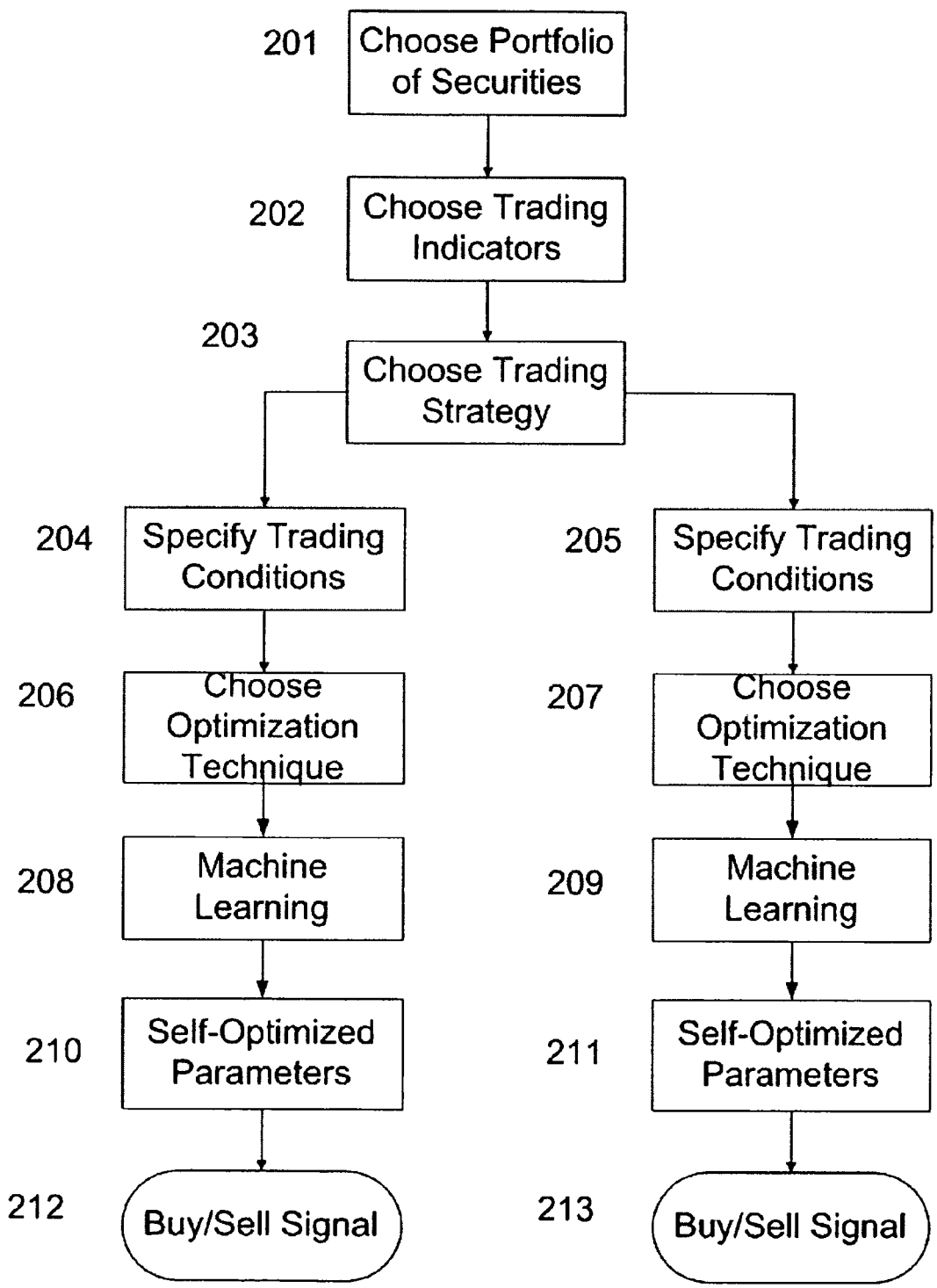
FIG. 2 illustrates a trading signal generation process.

Trading Software module is used in our system to build, evaluate and test trading indicators and trading strategies. It has a variety of pre-programmed trading strategies and trading indicators. Trading software produces Buy/Sell signals according to one or more trading indicators and/or trading strategies, both in a backtest mode or in a real-time mode. After a satisfactory amount of testing, the user can switch this software into a real-time and real-money mode, thus the trading software produces Buy/Sell signals that are transmitted via our Automatic Execution platform to computerized exchanges for real-time execution. The trading software utilizes an unlimited number of optimization techniques, as well as unlimited number of trading indicators and mathematical formulas. Trading signal generation process is illustrated by the flowchart in FIG. 2.

To start using this trading software, the user of the system has to choose the portfolio of stocks that he wants to trade and to enter appropriate securities symbols (tickers) into the trading software (201).

Then, he has to choose his preferred trading strategy or trading indicator for the selected portfolio of securities. The user can choose from a variety of technical indicators (such as Moving Average family of technical indicators) pre-programmed and ready to use in the trading software. The user could also create his own technical indicators by using Easy Language for technical indicator programming. For that, he could use one of mathematical formulas prepared in the trading software and, specifically, to choose from a set of arithmetic, trigonometric, boolean, relational, rules formulas. Those formulas could be used either alone or in combination with other pre-programmed mathematical formulas (202). By choosing his preferable indicator or a combination of indicators, the user builds his preferred trading strategy (203). Another, and much easier, alternative is to choose from the list of build-in and ready-to-use trading strategies programmed into the software. The user can base his trading decisions either on the build-in trading strategy or a combination of strategies. He can also make changes to the build-in strategies by pressing Modify Strategy button and/or by adding technical indicators to the chosen strategy.

As a result of strategy building process, the user has a ready-to-use system that generates Buy/Sell signals for the stocks previously entered into the portfolio. The next step would be to specify certain trading conditions in regard with the chosen strategy, such as period, start and finish dates of optimization, period, start and finish dates of back testing, period of back testing, shortest and/or longest and/or average trading span (difference (in bars) between purchasing a security and selling it), commissions, margin rates and other important trading strategy parameters (204). The user can now back test the trading strategy using wide array of back test specific parameters and see its performance history.

Another significant feature of our trading software is an Optimization Facility (205). To complete the strategy building process the user can run the trading strategy with or without optimization of different parameters and rules built into trading indicators and, subsequently, trading strategies. User can choose from a variety of optimization techniques (206). In general, optimization techniques attempt to take into account all relevant trading data and trading parameters available on a current vastly developed marketplace. The goal is to generate Buy/Sell signals by taking as input all relevant trading information, data, parameters and indicators, and selecting only those of them which produce most accurate predictions of security's price movement. Most methods are based on regression and autoregression models, and process among other things time series trading data that reflect dynamics of securities prices.

After sufficient amount of back testing, the user can either let the system go "live", i.e. let it generate real-time Buy/Sell signals on stocks in the portfolio or to engage in a Paper Trading activities. Paper Trading means that automatic order feature emulates sending orders (automatically and, completely, without human intervention) according to the chosen trading strategy to computerized exchanges and receiving confirmations of executed orders but real money is not invested. Paper Trading provides an opportunity to test trading strategy performance in real-time. Another possible use of Paper Trading is to consider and to evaluate different execution alternatives offered by our system against real-time market conditions (detailed explanation on different execution alternatives is presented later in this document). After sufficient amount of back testing and/or Paper Trading, the user can use the system to transfer automatically real-time Buy/Sell orders on securities in the portfolio to computerized exchanges.

Yet another and a more sophisticated way to use our trading software is by using power of real-time Self-Optimization and Machine Learning built into the system (207).

Self-Optimization refers to the ability of systems or components to efficiently learn from experience, and automatically tune themselves to achieve the overall goal. Based on a real-time data feed, Self-Optimization feature perpetually testing in real-time all possible combination of methods and parameters and chooses the best ones (208). With self-optimization, the user will receive trading signals based on up-to-the-moment optimized trading parameters rather than on the parameters received during optimization on a backtest. The user of our system has an option of choosing optimization parameters, but to turn-off self-optimization features. Self-Optimization ensures that optimal trading parameters are constantly updated and always in place for real-time trading.

Generally speaking, optimization techniques examine all possible combinations of indicators and parameters trying to find out a best model (an optimal model). The current optimal model, its factors and coefficients, are being perpetually verified bar-by-bar based on the latest trading data. Each bar's trading data is used as an input for optimization technique, and a new optimal model is being determined. Then the optimal parameters of the found model are entered back into the trading strategy, and new Buy/Sell signals are generated based on the newly determined optimal model. I.e., a Machine Learning mechanism is taking previously determined optimal models, their parameters, components and trading results as an input for building a new model that will produce new improved Buy/Sell signals.

Figure 3:
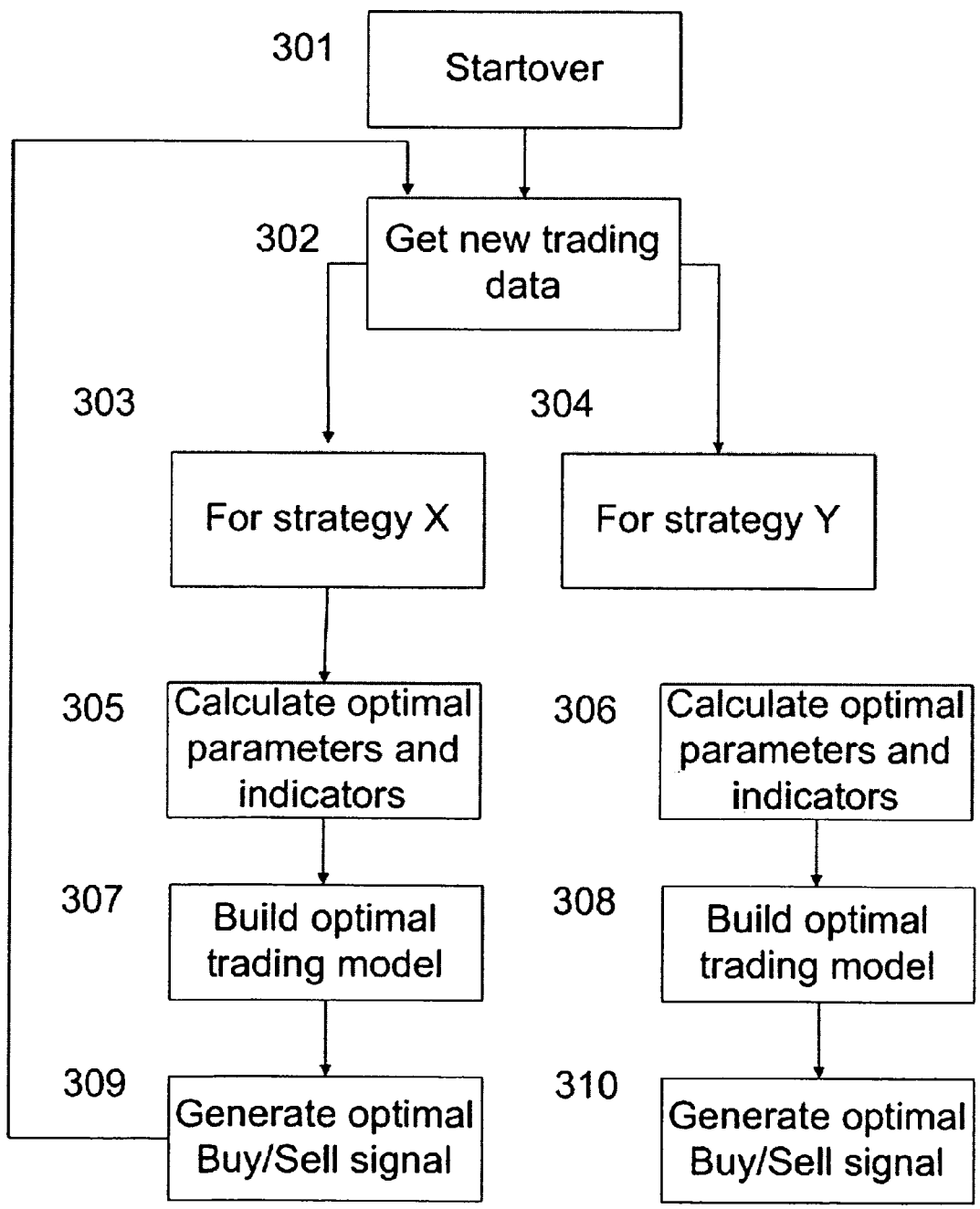
FIG. 3 presents a graphical overview of a Machine Learning mechanism.

Thus, our system of producing Buy and Sell trading signals is a real-time self-optimizing and Machine Learning system. A Machine Learning mechanism overview is presented in FIG. 3.

Automatic Execution Platform

Figure 4:
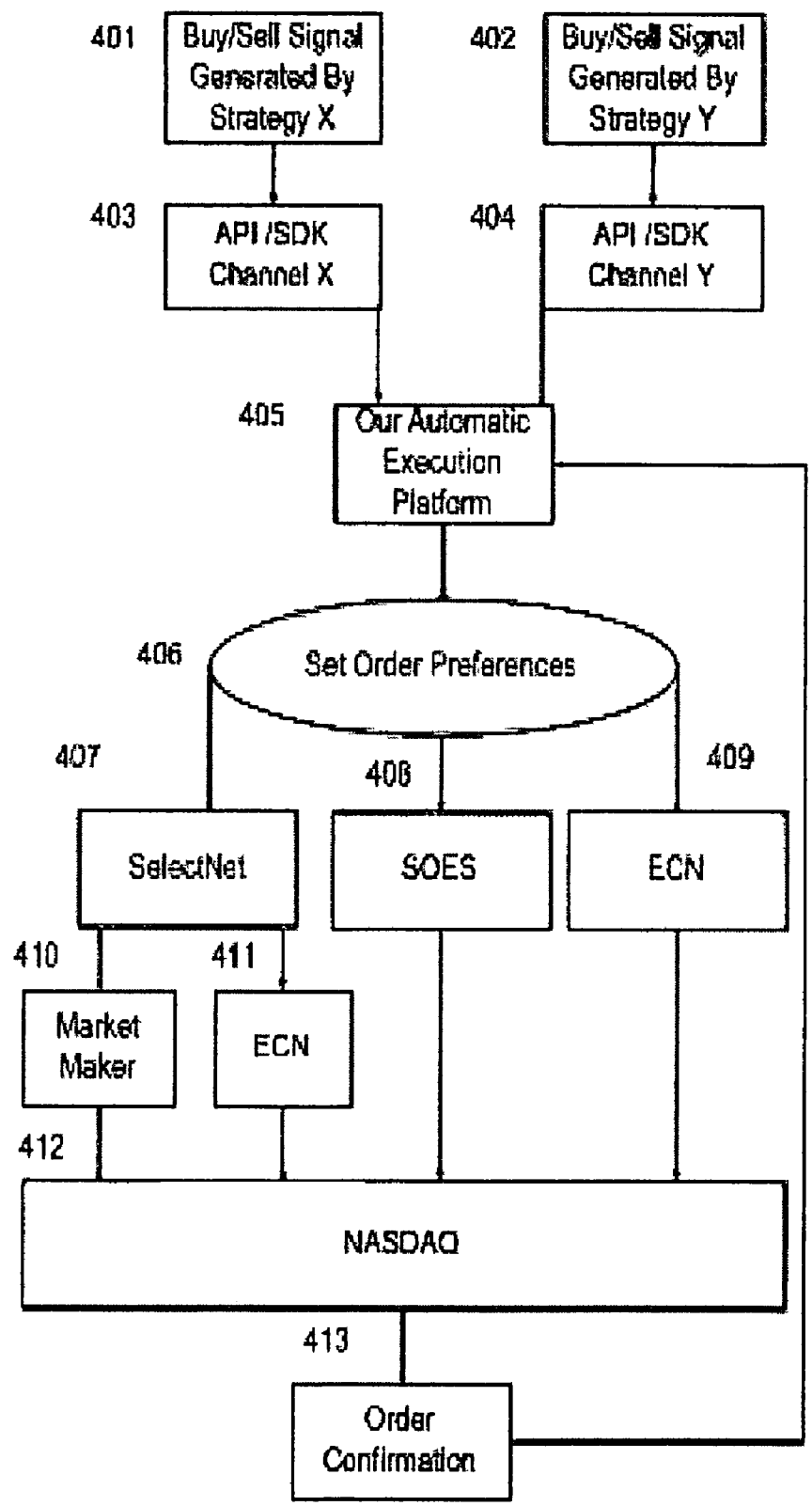
FIG. 4 shows Automatic Execution platform flowchart and shows order transmitting process for a NASDAQ security.

Graphical overview of Automatic Execution platform is shown in FIG. 4 by an example of order transmitting flowchart for a NASDAQ security.

There are several direct access execution platforms, like RealTick or REDIplus.

To facilitate automatic execution option we establish connection to one of these platforms using a set of API functions.

Using the API functions of direct access execution platforms, we can connect our invented system, and its automatic execution platform, in particular, to computerized exchanges, enabling our system's users to send orders automatically.

After a Buy/Sell signal is generated by the trading software (401), it goes through the connected API (402) to our automatic execution platform (403), which enables, upon user's request, to transfer orders automatically and completely without human intervention to computerized exchanges, according to user-predefined order qualification and execution parameters (404). Shapes 405-410 illustrate the order routing choices by an example of the NASDAQ security.

Figure 5:
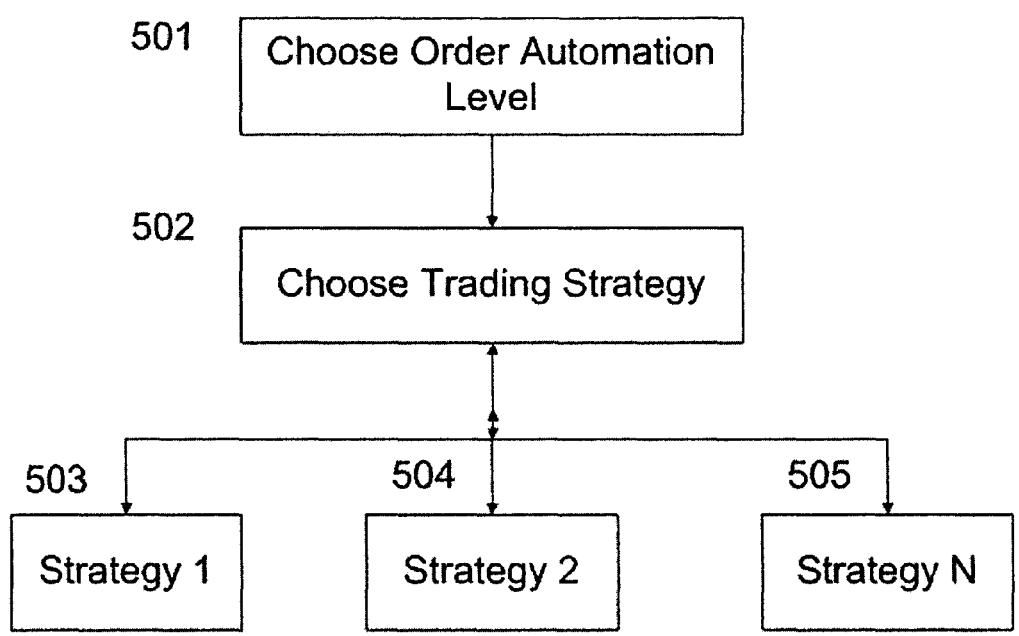
FIG. 5 provides a flowchart describing order preferences choices available in Automatic Execution platform.
Figure 6:
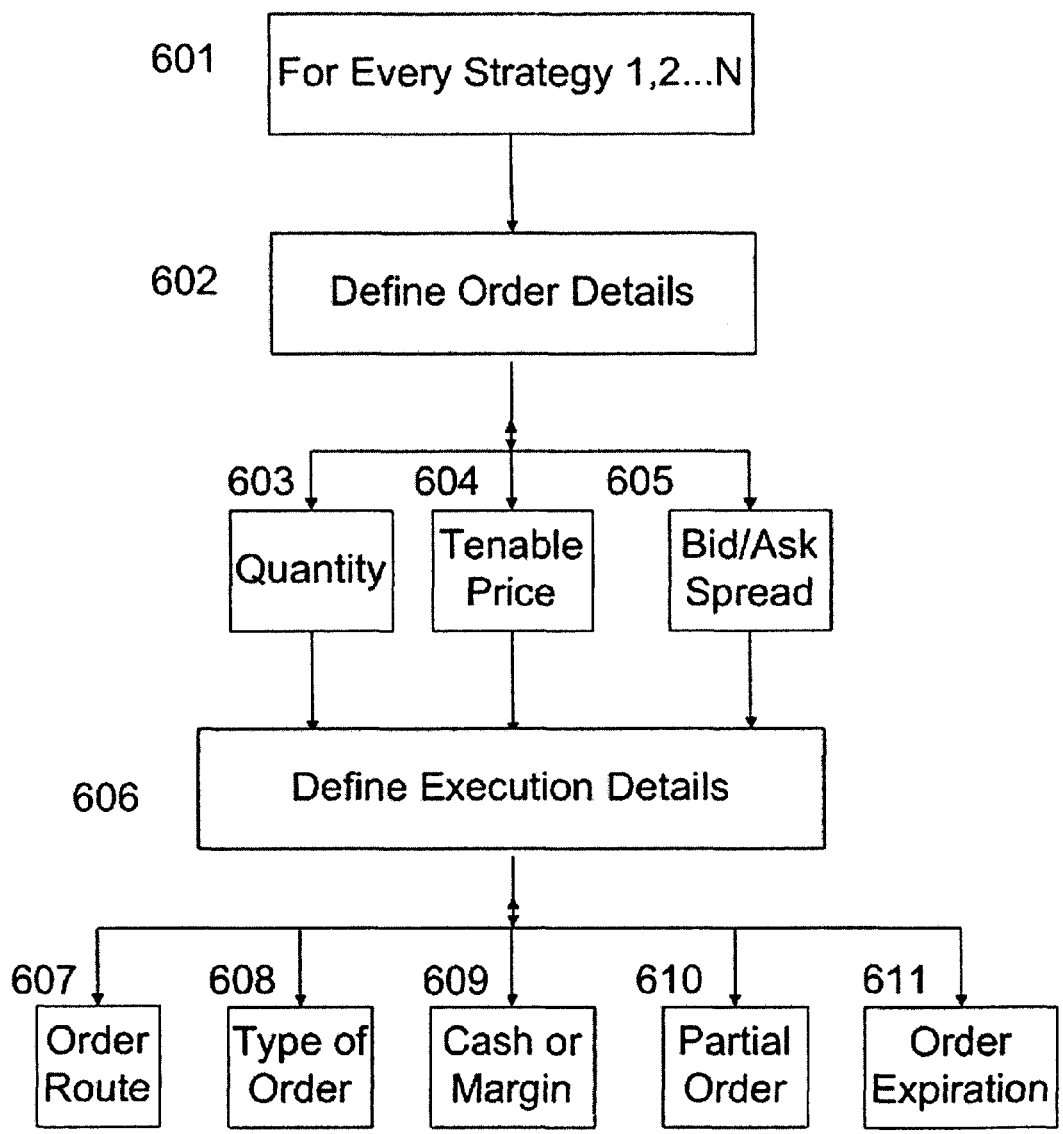
FIG. 6 provides a flowchart describing order execution options available in Automatic Execution platform for every trading strategy 1 . . . N.

Order details and order execution options available in Automatic Execution platform are illustrated in FIG. 5 and FIG. 6 (for trading strategies 1, 2 . . . N).

In order to transfer his orders automatically, the user of the invention will have to open an account with a computerized brokerage, banking or other trading firm that grants his clients direct access to computerized markets.

First, the user has to choose the level of order execution automation (501). He has three choices here: he can choose completely automatical trading option where all trades generated by our trading software are transferred to exchanges without his further confirmation or intervention; or he can choose semi-automatic order execution option, i.e. when Buy/Sell signal is generated by the trading software, it is transferred to our execution platform for user's Order Confirmation. In such a case, a special Order Confirmation window does appear, and the user will have to confirm the order by clicking on "OK" order confirmation button. Third order execution automation option is a regular execution option; here the user receives Buy/Sell signals from our trading software and he transfers them to the marketplace by manually typing order details and execution parameters.

Second, the user has to choose from a list of prepared trading strategies which strategy or strategies he decides to use in his trading (502, 503, 504 and 505). The user can adjust here different order execution automation levels for different strategies.

Third, the user has to choose specific order execution preferences (602) for each of the chosen trading strategies 1, 2 . . . N (601). He can start with choosing the quantity of each order, i.e. a number of shares to be executed in each order (603). For each trading strategy, the user can choose different order quantity. The user can continue with choosing low and high limits for Tenable Price check (604). Due to irregular market conditions or to data feed errors, some completely untenable prices could possibly appear once in a while, like $2,040 per share instead of $20.40 price. By default, we have a minimal Tenable Price of $1 and a maximal Tenable Price of $200.

The user is asked now to choose his preferable Best Bid/Best Ask Spread parameters (605). By this, the user makes personal adjustments of orders details according to his preferences. By Best Bid/Best Ask Spread we mean the difference between current market Best Bid or Best Ask and between the order price that the user wishes to execute. For example, if user chooses Best Bid/Best Ask Spread of two cents and he wishes to sell certain security, then if the best bid price received from the marketplace is $20.40, our automatic execution platform will send Buy order of $20.42. By this, the user wishes to buy the security in higher price than current market price, and, thus, his orders have better order execution chances. Similarly, if user chooses Best Bid/Best Ask Spread of two cents and he wishes to sell certain security, and if Best Ask price received from the marketplace is $20.40, then our automatic execution platform will send a Sell order of $20.38 to the exchange.

Fourth, the user chooses order execution preferences from a list of predefined parameters (606). Here he defines what type of order will be send to the marketplace and how it will be executed.

Firstly, the user chooses his preferable order route, i.e. through which execution channel his order will be sent (607). In case of the NASDAQ market, he has a Default option, i.e. the order will be sent to the general market where it will be executed by one of the market makers; an option to choose one of the several ECNs, or an option of choosing SOES or SelectNet systems execution routes.

Now the user chooses a type of Order Price (608)— for the FOREX trading we use Ask and Bid currency quotes instead of last trade quote, therefore Buy/Sell orders should be send to FOREX markets according to Best Ask and Best Bid prices. The user can choose to use Market Order, Limit Order, Stop Market Order, Stop Limit Order, Trailing Stop Order and other types of orders which are rarely used and could be executed only through one or few execution routes, like only through one ECN. Hereafter we explain only main types of orders:

Market Order is sent to exchanges without specifying an exact execution price, it is sent and executed at a price available in current open market conditions.

Limit Order is an order to buy or sell at a designated price. This order will be executed at this specified limit price or better. For example, Buy Limit order=$20.40 could be executed at $20.40 or any price lower than $20.40. Stop Market order: a Buy Stop order is placed above the current market and is selected only when the market trades at or above, or is bid at or above, the stop price. A Sell Stop order is placed below the current market and is selected only when the market trades at or below, or is offered at or below, the stop price. Once the stop order is selected, the order is treated like a market order and will be filled at the best possible price.

Stop Limit order: a Stop Limit order lists two prices and is an attempt to gain more control over the price at which your stop is filled. The first part of the order is written like the above stop order. The second part of the order specifies a limit price. It indicates that once your stop is triggered, you do not wish to be filled beyond the limit price. Stop Limit orders should usually not be used when trying to exit a position.

Trailing Stop order is a Stop Market order that follows market price with a difference of the specified trail amount, creating a Stop Market order, as the market price moves away from the original price. Here the user has first to choose an amount of this "following"—trailing amount. For example, if the user chooses a trailing amount of $1 when the current price is $20.40— than the trigger price is $19.40 for Buy orders and $21.40 for Sell orders. The Trailing Stop order will place a Market Sell Order once current market price falls to $19.40. The Trailing Stop order will place a Market Buy Order once current market price increases to $21.40. Trailing Gain order is similar to Trailing Stop order and it differs by the fact that A Stop Market order is generated when the order is gaining a specified trailing amount. For example, if the user chooses a trailing amount of $1 when the current price is $20.40—than the trigger price is $21.40 for Buy orders and $19.40 for Sell orders.

Now the user chooses if he wishes his orders to be executed in a Margin account or Cash account (609). Every user that has an account with a broker or investment bank has automatically two accounts open to his disposal. When the user has positive cash balance—he can choose if to trade on a Cash account or Margin account. If the user chooses to trade on Margin account, he will need to pay to his broker or bank a margin interest rate, which is normally higher than the normal interest rate offered on the market. On the other hand, many traders prefer to trade on Margin account that allows the trader to free up funds that could be used for other investments.

Now the user chooses if his order could be executed on a Partial execution basis or All-or-none execution basis (610). Partial execution order can be filled partly. Sometimes, one Partial execution order is executed as several Partial execution orders. For example, if the user places a Partial Buy order of 1000 shares, this order could be executed as a two Partial execution orders of 500 shares each. All-or-none order is an order to be executed in its entirety or not executed at all.

Finally, the user chooses order expiration type (611). There are many different choices for order expiration; we explain hereafter only the main ones.

IOC order (Immediate-Or-Cancel)— is an order requiring that all or part of the order be executed immediately after it has been brought to the market. Any portions not executed immediately are automatically cancelled.

GTC order (Good-Till-Cancelled)— is an order which remains in force until executed, or cancelled by the user. This type of orders is applicable when user wishes to be engaged in a non-automatic execution option.

Day order is an order that, if not executed, expires at the end of the trading day.

By this, the user has defined all order qualification and execution parameters. The orders are ready to be transferred to the marketplace according to these parameters.

There are many factors that affect trading in a real-time environment. Probably, the most common of them is a partial order execution or a partial fill. To adjust to this feature of real-money trading, our automatic order execution platform has a specific partial fills handling feature. For example, the user has tuned the platform to generate Buy/Sell orders in quantity of 100 shares. One of the orders, lets say, Buy Limit order, has been partly filled—only 30 out of 100 shares were bought. Buy Limit order for additional 70 shares is still open. At some point, while Buy Limit order is still open, trading strategy has generated Sell Limit order. Our automatic execution platform knows that only 30 shares were executed at a Buy Limit order, so it sends Sell Limit order for only 30 shares. While sending Sell Limit order of 30 shares, it automatically cancels the remaining Buy Limit order of 70 shares.

Another example of smart order-handling is a case of order not executed. Assume that a, Buy Limit IOC order of 100 shares of a certain security was not executed and, therefore, immediately cancelled. After a period of time, Sell Limit signal is issued for that security by the trading software but since there were no securities bought, our execution platform is automatically sending Short Sell Limit IOC order instead of Sell Limit IOC order.

Also, the system has an option to establish a withdrawal price. For example, a Buy order will not be sent to the marketplace if there is a downtrend in a market, i.e. the last trade price has dropped by withdrawal price amount from the Buy signal price. For that, the user determines maximal price deviation of Buy/Sell signal from the current market Best Bid/Best Ask price. For example, if the trading software generated Buy signal with share price of $20.40 and user predetermined maximal price deviation of five cents, the order will be sent to the marketplace only if the current Best Bid price is below $20.45.

Trade and Profit Manager

After a Buy/Sell signal is generated by the trading software, may it be back testing, Paper Trading or real money trading signal, it is accounted in our portfolio management software—Trade and Profit Manager. In case of back testing or Paper Trading, trading signal is transferred directly to Trade and Profit Manager. In real money trading, the Buy/Sell signal, or more appropriately, Buy/Sell order is transferred to market exchange first, and, then, upon execution, it goes to Trade and Profit Manager according to order execution price and quantity parameters.

Our Trade and Profit Manager is a typical portfolio management software that enables the user of the invented system to monitor and analyze his securities positions, providing detailed insight into how well his investments are performing.

It is used both to evaluate trading performance and as a data processing based apparatus that enables automatic order transfer.

As orders are executed, market quotes change or trades occur in the markets, the system will update market data, portfolio holdings, including cash, and recalculate purchase and sale orders for all relevant securities.

Trade and Profit Manager can monitor multiple securities positions in one portfolio or multiple securities positions in multiple portfolios and different accounts. It enables the user to monitor positions in different securities markets, such as separate profit/loss calculations for operations performed at stock exchanges and for operations performed at FOREX exchanges. Profit/loss data breakdown could be provided on per date or other periodical basis. Trade and Profit Manager provides tens of specific trading performance parameters, including date of order, type of order, security symbol, trade quantity (number of securities in transaction), order execution price, total amount of executed shares, commissions, pass through and miscellaneous fees of different types, profit/loss parameters per security and per portfolio, including realized profit/loss and non-realized profit/loss, total portfolio value for both long and short positions, per portfolio detailed profit/loss and other information. Every order can be executed through different execution means, so execution details and parameters are available in our Trade and Profit Manager. Market securities can be arranged into specific groups within a portfolio and sorted on any parameter. If the trader chooses to use more than one trading strategy, per strategy detailed trading results are available. All securities positions as well as number of market indices (such as NASDAQ-100 index) are automatically updated, on a real-time basis or on any chosen time interval basis (once per hour, per two hours, per day). Price and time alerts can be set on securities positions and other trading parameters, such as maximal/average trading span (distance between buy and sell orders). Transaction history and other historical trading parameters are also available in our Trade and Profit manager. Account summary is provided including per portfolio and/or per account equity and cash balances, margin and short positions summary. Account summary details for any account and/or portfolio are updated automatically with buy and sell orders execution. A special trade evaluating feature (Trade Evaluator) examines user's trading over a variety of time spans and different parameter groupings (such as day trades versus non-day trades, Long trades versus Short trades). Using Trade Evaluator features helps the user to identify possible trends in successful and unsuccessful trades.

Data concerning each user's trading account/accounts resides on computer files on a per-portfolio basis and includes current holdings for each security and its identification data, account cash and securities positions, maximal investment limit. A record of all trading activities is maintained on the system, including all transactions and unexecuted orders.

PREFERRED EMBODIMENTS

The invented system can be used either as a stand-alone trader software workstation or as a module to an existing trading software. Using different options of our Automatic Execution platform, the system could be used as a completely automatic trading system, semi-automatic system or as a usual technical or fundamental analysis trading software.

Even today, after computerization has evolved in every aspect of life, most of securities traders are making their decisions based on checking a huge amount of data available over the mass media and the Internet. There are a variety of tools and software to guide the trader in his decision. Most of it is used to summarize securities data in a form of technical or fundamental indicators. Technical analysis means a valuation of security based on the analysis of it price, volume and their dynamics, whereas fundamental analysis means a valuation of security based on examining the company's economic financials and operations, such as sales, cash flow, earnings and other fundamental factors data. Technical analysis indicators are used to create securities charts that are available on a variety of Internet web sites or in technical analysis charting software. An example of such charting software is AspenRes software (www.aspenres.com). Using this type of software, the trader can receive Buy/Sell decisions based on a graphical position of his preferred trading indicator, for example a rise or a fall of such an indicator. Such method of receiving trading decisions is obliging the trader to be present at the time of trading, to examine trading indicators and to involve his mental ability and judgment in receiving decisions per-security, i.e. based for each security individual chart is created and mental analysis is performed.

Evolvement of charting software is created a new type of trading software that produces Buy/Sell signals based on rules developed regarding technical indicators.

An example of such software is an OmniTrader at www.omnitrader.com. For example, user of simple charting software is examining individually for each security when MovingAverage of 5 bars (MA (5)) is greater than zero for a Buy decision. In trading software, the software itself checks if MA(5)>0 generates Buy signal automatically for every security in a portfolio, thus saving time of the user while eliminating problems involved with mental and visual judgment.

There are two main types of trading software available on the market today. The most commonly used type is technical analysis software. These software packages are using a number of predefined technical trading parameters and technical indicators to provide the user with the tools that generate him Buy/Sell trading signals. Some of the technical analysis software enables the user to add his own trading indicators or mathematical formulas using easy programmable language tools. Second type of trading software is built based on fundamental analysis basics. Fundamental analysis software is used to produce Buy/Sell signals based on fundamental factors data rather than on price and volume trading data in technical analysis software. Some of the trading software use optimization to create Buy/Sell signals based on optimal parameters.

The invented system could easily be used both as a technical and as fundamental stand-alone optimization trading software. Having said that, it is important to mention that using the invented system as technical analysis software is our preferred embodiment. Our trading system has several predefined technical analysis trading strategies and trading indicators for user to choose from. The user can also add his own technical analysis strategy or indicator. If the user chooses one of the strategies, the system will automatically generate Buy/Sell signals according to trading strategy parameters calculations. The user could also turn-on one of the two optimization methods available as well as self-optimization feature; and to produce Buy/Sell signals accordingly.

After opening an account with direct access electronic broker or financial institution, the user can tune our Automatic Execution Platform to transfer the signals automatically to securities marketplace, to send signals to the marketplace after his confirmation or to manually type orders in his broker web interface browser or direct execution software. By using automatic execution option, the user of the present invention transforms the trading system into automatic execution stand-alone technical analysis trading software where all stages of operation are automatic, from producing trading signals to direct marketplace execution, which is the system's preferred embodiment.

With an additional programming work, our technical analysis trading software could easily be transformed into a fundamental analysis trading software. Such trading software will receive from the remote data server a variety of fundamental securities parameters, such as: sales, income, and earnings etc. data. The software will rank these fundamental parameters according to user-defined ascending-descending data definitions; it will perform mathematical operations, such as sum, divide or exponentiate these parameters, to create trading strategy; it will include a number of predefined trading strategies and will have an ability to add user-defined trading strategy based on a combination of fundamental parameters and it will produce Buy/Sell trading signals according to these trading strategies. Optimization, self-optimization, automatic and semi-automatic execution will be available in such software to make it an automatic execution stand-alone fundamental analysis trading software.

Implementing the invented system will eliminate the need of the trader to be near his trading software at the time of trading. By a virtue of automatic order execution, many traders who don't have enough time to participate in an investing process would be able to trade without quitting their jobs or decreasing their free time amount.

The invented system is useful to traders of every investment knowledge and experience level. For an average trader it could be used as stand-alone trading software and for the highly-experience trader or for a financial institution it could be used as an automatic execution module to be connected with existing software. Using Application Programming Interface (API) tool, second-party programmer could integrate our automatic and self-optimizing trading software into his company trading software and to add, by this, a feature of automation and self-optimization to his existing trading software.

Another possible embodiment of the present invention is to provide its users with a mobile-phone based semi-automatic trading system. Using WAP (Wireless Application Protocol) technology, Buy/Sell trading signals generated by the trading software, are transferred to user's WAP-enabled phone, Palm or Windows Powered Pocket PC handheld. All of these products require wireless Internet access from a carrier or wireless Internet provider. In such a case, we will add a Wireless Confirmation execution option to the three options available in our Automatic Execution platform. If user chooses to use Wireless Confirmation option, he thus receives Buy/Sell signals generated by our trading software directly to his mobile phone device. He can now either to confirm or to not confirm the trade by pressing Trade Confirmation button especially installed on his mobile device. In a case of trade confirmation, his mobile device sends to our system a special confirmation signal according to which, Buy/Sell signal will be transferred to the marketplace according to user-define execution parameters.

Another way to transfer Buy/Sell signals to user's cell phone for his confirmation is by using SMS (Short Message Service) available for most mobile phone users.

SMS is a standard system for sending messages of up to 160 characters to cell phones, pagers and similar devices. Using SMS, Buy/Sell signal will be transmitted to user's mobile device, including security name (symbol), quantity of trade and Bid/Ask price. The user will have an option of sending an SMS back to our system, confirming or not confirming the order. If no confirmation SMS is sent during certain period of time, our system will regard the order as not confirmed, and will not execute it, accordingly.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A multi-channel machine learning trading system for generating a number of independent trading strategies for respective securities, the multi-channel machine learning trading system comprising:
   a data feed module for receiving real-time and historical trading data on the securities from a remote data server;
   a trading software module comprising:
   a trading strategy building module for building the number of independent trading strategies and generating independent respective buy/sell trading signals, based on a number of respective trading parameters used to build each of the trading strategies, the trading parameters being different for each trading strategy,
   an optimization choice module for generating optimized trading parameters, for each of the trading strategies, by applying a) the number of respective trading parameters and b) historical trading data including a price movement over time of the respective securities in the trading strategy to a regression model to select only the trading parameters that generate respective buy/sell trading signals over time that correspond to the price movement of the respective securities, the selected trading parameters forming the optimized trading parameters, and
   a multi-channel machine learning module for independently generating respective self-optimized buy/sell trading signals for each of the trading strategies, by further optimizing the respective optimized trading parameters for each of the trading strategies, based on respective trading results from the real-time trading data; and
   a multi-channel automatic execution platform for transferring the respective self-optimized buy/sell trading signals for each of the trading strategies simultaneously through a number of parallel programming connection channels from a computer to one or more computerized exchanges, automatically and completely without human intervention.

2. The system of claim 1, further comprising means of choosing if each of the buy/sell trading signals is executed as a market order, a limit order, a stop order or an order of different predetermined type individually for each trading strategy.

3. The system of claim 1, further comprising means of choosing if each of the buy/sell trading signals is executed on a partial execution basis or on an all-or-none execution basis individually for each different trading strategy; and means of handling partial execution cases and readjusting the system when the partial execution occurs.

4. The system of claim 1, further comprising a hard-disk residing database and a computer storage means for storing and accounting a trader's profit/loss information according to execution details of each of the buy/sell trading signals, independent of an additional bank or brokerage accounting system and in addition to a profit/loss accounting system of a bank/brokerage.

5. A system that is a multi-channel automatic execution system based on an application programming interface (API) or a software development kit (SDK), and which uses API/SDK programming procedures, functions and DLLs to establish a number of parallel connection channels in order to connect a user trading system with a further trading system of a bank or a brokerage, or with a trading exchange directly, the system comprising:
   an optimization choice module for generating optimized trading parameters, for each of a number of independent trading strategies, by applying a) a number of respective trading parameters and b) historical trading data including a price movement over time of the respective securities in the trading strategy to a regression model to select only the trading parameters that generate respective buy/sell trading signals over time that correspond to the price movement of the respective securities, the selected trading parameters forming the optimized trading parameters,
   wherein the system uses the API/SDK programming procedures, the functions and the DLLs to send a number of different and independent buy/sell trading orders from a user computer of the user trading system to computerized exchanges of the further trading system or the trading exchange in a multi-channel mode, automatically and completely without human intervention, through connection channels established by the API/SDK, the number of independent buy/sell trading orders generated by self-optimizing the respective optimized trading parameters for each of the trading strategies.

6. The system of claim 5, further comprising means of choosing an execution trading strategy for each of trading channels corresponding to the connection channels from a number of strategies, according to strategy performance parameters including at least one of a profit/loss, a volatility, or a maximal drawdown.

7. The system of claim 5, further comprising means of choosing a level for order execution automation including a completely automatic execution level, a semi-automatic execution level or a regular user-initiated execution level.

8. The system of claim 5, further comprising means of choosing a different order execution automation level individually for each trading strategy in the system.

9. The system of claim 5, further comprising a multi-channel means of choosing different execution channels for different trading strategies, from a list of available order execution channels, the multi-channel means choosing through which execution channel each order is sent to a specific market for each specific trading strategy.

10. The system of claim 5, further comprising a multi-channel means of choosing a different order quantity and a different maximal allowable bid/ask spread for each trading strategy.

11. The system of claim 5, further comprising means for choosing if the order is executed on a margin or on a cash account for each trading strategy.

12. The system of claim 5, further comprising means for choosing for each trading strategy if the order is executed as an Immediate-Or-Cancel (IOC) order or as a Good-Till-Cancelled (GTC) order.

13. The system of claim 5, further comprising programming means of receiving and storing order execution particulars through the API/SDK.

* * * * *